CUTTING STROKE ADJUSTING MECHANISM

Filed April 20, 1965 2 Sheets-Sheet 1

Inventors
Michael M. Young
Reginald Couzens
By their attorneys
Howson and Howson Inventors
Michael M. Young
Reginald Couzens
By their attorneys
Howson and Howson.

United States Patent Office 3,292,473
Patented Dec. 20, 1966

3,292,473

CUTTING STROKE ADJUSTING MECHANISM

Reginald Couzens, 403 Palmers Lane, Wallingford, Pa. 19086, and Michael M. Young, 7412 Stenton Ave., Philadelphia, Pa. 19150

Filed Apr. 20, 1965, Ser. No. 449,567
3 Claims. (Cl. 83—318)

This invention relates to apparatus for adjusting the cutting stroke of machines in which two or more rotary knives or cutting devices move in a cutting stroke toward and from a continuously moving, continuously formed fabricated article made of paper, paper products or the like such as, for example, a web of paper, cardboard and the like, or a tube made of paper, chipboard, cardboard and the like. The tube or web or other product may be formed of single or multi-ply sheets or strips of paper or cellulosic material, the invention not being limited to cutting paper or paper products.

In the manufacture of facial tissues by machine, a web of predetermined thickness and of predetermined layers of paper moves along on a conveyor belt to a cutting station whereat a rotating disc knife or gang of knives is moved toward and from the web to sever packs from the web, later to be put into a container or box. Likewise, in the manufacture of paper or fiber-bodied containers which are made by forming a cylindrical tube on a mandrel with the tube moving continuously along the mandrel while it is being formed, rotary cutting knives move toward and from the mandrel to cut the tubing into predetermined lengths.

In each case, it is often necessary to adjust the position of the knives. In making tubing bearing printed designs on certain machines, the stroke of the knives must be constantly adjusted so as to keep in register with the designs. It must be possible in both cases to make the adjustment while the machine is running because any stoppage of the machine is not only wasteful of time and production, but also is accompanied by difficulties and delays in starting up again due to breakage of the strips of materials passing through the machine, the presence of scrap which must be cleared away, the need to have the operations coordinated and, in the case of container manufacture the knives must be restarted in register with designs on the containers.

The present invention broadly concerns the continuous cutting technique and machine wherein a cutter carriage continuously reciprocates alongside a mandrel or conveyer in such a way that during a portion of the cycle of reciprocation both the cutter carriage and the being-formed tube or conveyed web are traveling in the same direction and at the same speed. The invention includes means and methods for adjusting the length and speed of the lengthwise reciprocating stroke of the cutter alongside the being-formed tube or the conveyed web while the machine continues in operation and without interruption of production.

For convenience, the invention will be described as used in connection with helically wound fiber-bodied cylindrical containers or cans. But, it must be understood that the invention has been used successfully with facial tissue making machines and is not limited to either of two machines specifically identified above.

Several different methods for making helically wound tubular containers are already known, but most of them use the same general technique for winding. Speaking simply, two or more plies of strip material are wound on a mandrel and the strips are caused to adhere together to form a tube which is thereafter cut up into convenient length or "sticks." These length commonly include a plurality of container patterns which are cut apart to form individual containers. The severing into individual containers may be done on the machine or later on a recutter.

Continuous cutting machines as used in the art of spiral tube container manufacture are well known and have been used extensively. They include a cutter carriage upon which the cutters are mounted, means for reciprocating the carriage back and forth alongside the tube as it is being formed on the mandrel, and means for pivoting the cutters toward and from the tube at the appropriate points in the cutting cycle. The reciprocating means generally comprise a continuously rotating cam, an assembly reciprocated by said cam and connecting means for moving the cutter carriage in direct proportion to the motion of the assembly. This connecting means magnifies or reduces the motion characteristics of the assembly according to a fixed ratio.

Proper cutting of the tube requires that both the tube and the cutter carriage travel in the same direction and at exactly equal speeds during cutting. Any tendency of the carriage to move lengthwise relatively to the tube during cutting (as will occur if the carriage and tube do not travel at equal speeds) will result in a rough or helical cut. Equality of speed between the carriage and the tube is achieved, firstly, by designing the cam to give the assembly a constant velocity during the cutting portion of the cycle and ultimately by setting the connecting means so as to magnify the motion characteristics of the cam, as it is transmitted to the assembly by precisely the correct amount.

In prior art machines, it has been difficult to set this connecting means between the assembly and the carriage to give the carriage a speed and direction identical with that of the tube during cutting. The connecting means magnified the motion characteristics of the assembly with a fixed ratio to which adjustments could not be made without first stopping the machine before resetting the ratio. After restarting the machine if the cutter and tube movement were still not correct, the machine would have to be shut down again. The correct magnification ratio between the carriage and the assembly was only achieved by trial and error and exercising much pains and with loss of production time and material.

Therefore, in a machine which has a continuously operating cutter carriage that derives its motion characteristics through motion-magnifying connecting mechanism from a cam or other primary motion source, it is an object of this invention to provide means to vary and adjust the ratio of said magnification without stopping the machine.

Another object is to provide in such a machine for adjustment of the speed of the carriage in its reciprocating stroke without stopping the machine and without changing the rotation rate of the driving cam.

Another object is to provide in such a machine for adjustment of the lengths of the reciprocating stroke of the cutter carriage without changing the rotation rate of the cam and while the machine is running.

Other objects and advantages will appear as the invention is described in connection with the drawings.

Figure 1:
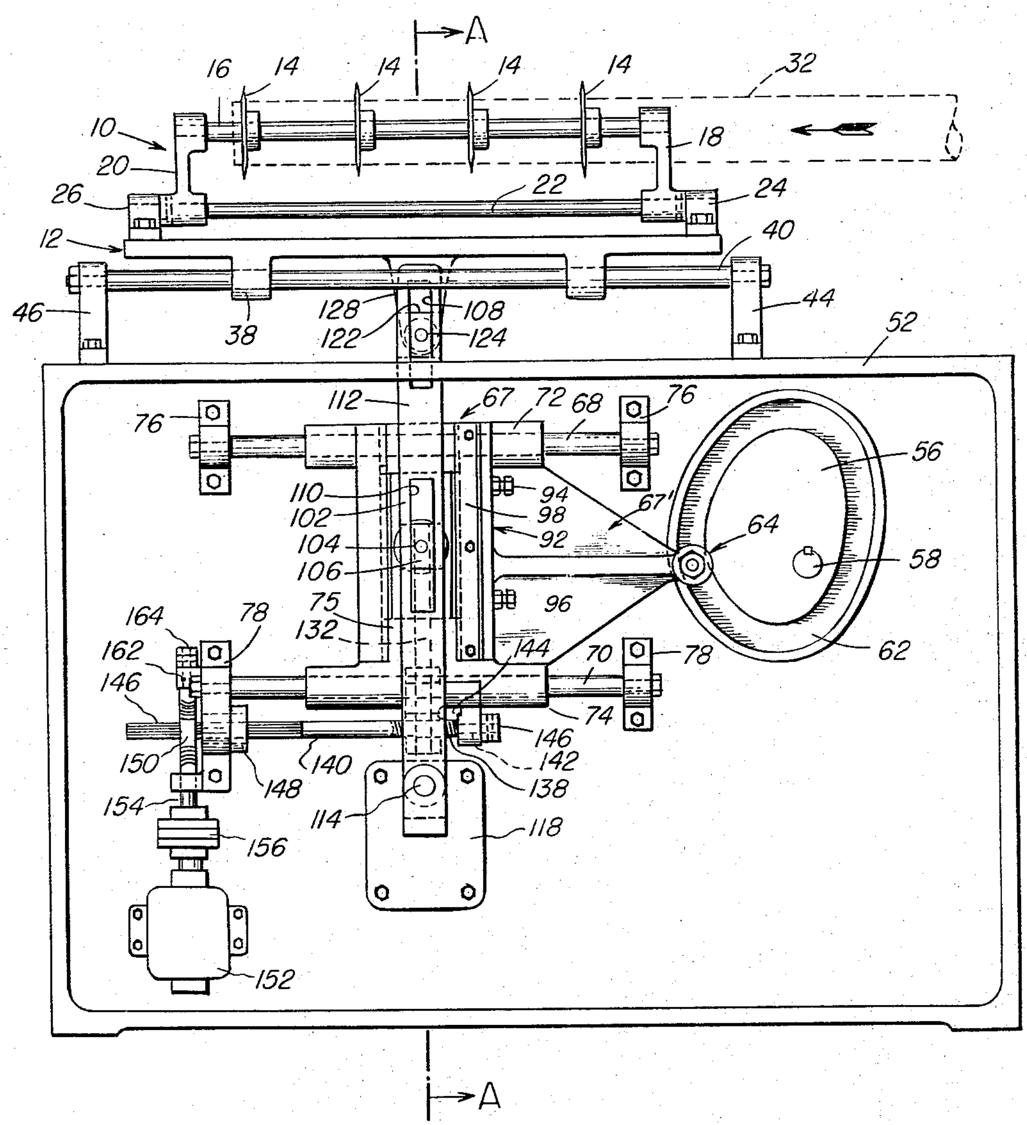
FIG. 1 is a front elevation view of a mechanism embodying the invention.

Referring to FIG. 1 of the drawings, it will be seen that the continuously reciprocating cut-off mechanism indicated generally at 10 includes a reciprocable carriage 12 and a plurality of cutters 14. The cutters are spaced a desired distance from each other and are fixedly positioned but adjustable along a common rotating shaft 16. Brackets 18 and 20 rotatably support the ends of shaft 16. Rotary movement is imparted to the shaft by conventional means (not shown). Brackets 18 and 20 are themselves rigidly mounted on a support shaft 22, the ends of which are rotatably mounted in support-shaft brackets 24 and 26 which, in turn, are bolted on carriage 12. Adjacent the cutters 14 is a spirally wound tube 32 (shown in dashed lines) ready to be severed to lengths. By conventional means (not shown), the tube is rotated and caused to travel over a mandrel (not shown) at a constant speed in the direction indicated by arrow 34. The tube is cut by oscillation of shaft 22 by conventional means (not shown) which causes the cutters 14 to cut into the tube.

Figure 2:
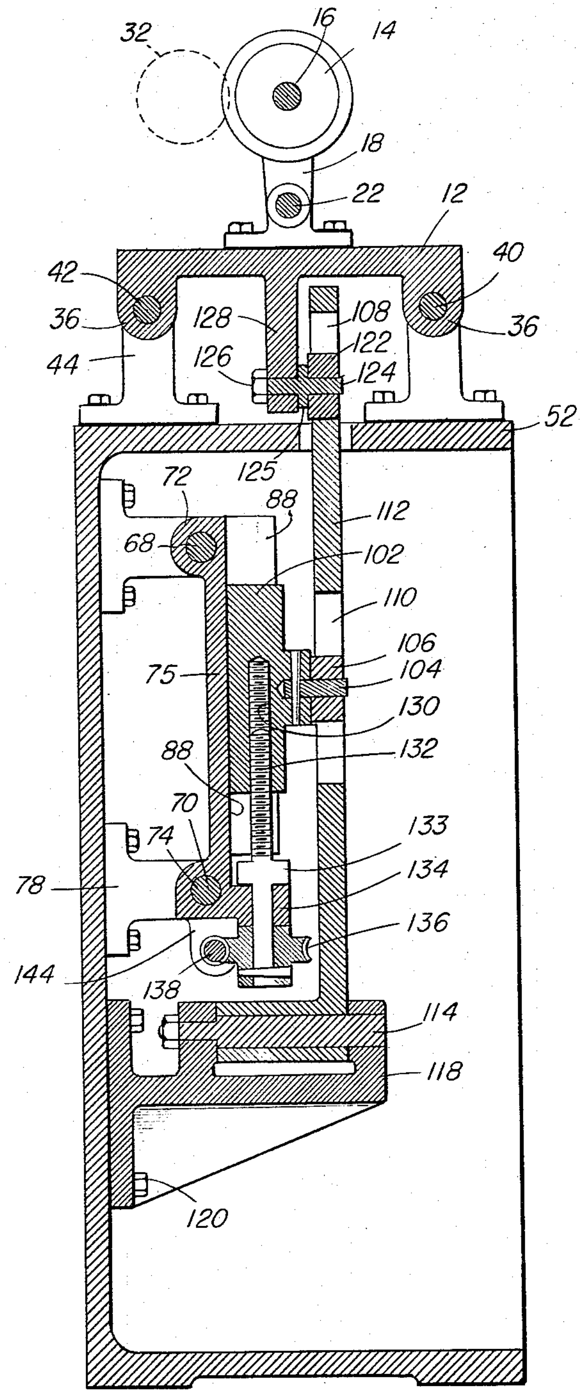
FIG. 2 is a transverse sectional view of the invention in FIG. 1 with the section taken on line A—A of FIG. 1, looking in the direction of the arrows.

Integral with carriage 12, but below and spaced from the ends of the carriage are two pairs of feet or lugs 36 and 38 (see also FIG. 2) which are slidably mounted on parallel shafts 40, 42 so as to slidably support the carriage 12. Support shafts 40 and 42 are fixedly mounted at their ends in brackets 44 and 46 bolted on housing 52.

Housing 52 houses driving means for reciprocating the carriage 12. It also houses the linkage system for varying the length and velocity of the stroke of the carriage 12 as it reciprocates.

Inside the housing is an eccentric driving cam 56 fixedly mounted on a power driven cam shaft 58. Cam 56 is provided with a cam groove 62 in which is fitted a cam follower indicated generally at 64.

Rigidly connected to cam follower 64 is a horizontal slide assembly, designated generally by numeral 67, which is moved back and forth by cam follower 64.

The slide assembly 67 is comprised of upper and lower slide bearings 72 and 74 slidable on upper and lower parallel shafts 68 and 70 which are each supported at their ends rigidly by brackets 76 and 78, respectively, bolted to the housing 52. The axes of shafts 68 and 70 are equidistant above and below cam shaft 58.

Joining the bearings 72 and 74 rigidly is a web plate 75 (see FIG. 2) in which is formed a vertical rectilinear slideway 88. Slidable in this slideway is a slidable adjustment block 102, which is adapted to be moved up and down the slideway 88 for the purpose of adjustment, as will presently be described.

As viewed in FIG. 1, the slideway is or may be undercut into the left wall of the web plate 75, leaving an overhang over the left edge of the front surface of the adjustment block 102. The right edge of the block is guided by guideway wall plate that is adjustable toward and from the slide block by adjustment bolts 94, 96 passing through a vertical wall 92 of the web 75. Overhanging the right edge of the slide block is the edge of a top plate 98 removably bolted onto the web plate 75. Although the details of a preferred form of slideway structure have been given, these may obviously be varied within the scope of the invention.

A lateral triangular extension 67' of the slide assembly 67 pivotally carries at its apex the cam follower 64.

In order that motion of the cam 56 imparted to the slide assembly 67 shall be transmitted to the cutter carriage, an upstanding operating lever 112 is pivoted at its lower end on a fixedly positioned pin 114 mounted in a cast bracket 118 bolted to and supported from the back vertical wall of the housing 52.

The upper end of lever 112 has a slotted connection to the cutter carriage 12 by a longitudinal guide slot 108 in said upper end in which is slidable a connecting block 122 mounted pivotally on one end of a connecting pin 124. The connecting pin 124 is threaded on its other end which extends through a lug or arm 128 depending centrally from the underside of the cutter carriage 12.

A nut 126 secures the pin to cutter carriage arm 128 and a central flange 125 between the arm 128 and block 122 serves to space them.

A pivotal and slidable driving connection between the slidable adjustment block 102 and the operating lever 112 is provided by a horizontal driving pin 104 extending from the adjustment block 102 and pivotally carrying a small connecting block 106 slidable in a guideway 110 longitudinally extending in the central portion of the operating lever 112.

From the foregoing, it will be apparent that horizontal rectilinear motion, irregular in speed and direction, is imparted to the slidable assembly 67 by the cam 56 in accordance with shape of the cam. This motion is transmitted to the operating lever 112 by the driving pin 104 and driving block 106. The lever, in turn, transmits its motion to the cutter carriage 12 by the connecting block 122 and connecting pin 124.

Four conditions exist in the apparatus described.

(1) The slide assembly 67 moves only rectilinearly.

(2) The cutter carriage 12 moves only rectilinearly.

(3) The cam 56 is so designed as to cause the slide assembly (a) to move in the same direction as the tube or other article which is to be cut, and (b) to move at a constant speed during the cutting.

(4) The mechanism transmitting the motion of the slide assembly to the cutter carriage multiplies the motion of the assembly.

Four requisites must be met in order for the machine to function properly in making a square cut of the tubing or web, or whatever is conveyed and to be cut and in order that the production of the tubing shall not be interrupted.

*1st*.—The cam must impart to the slide assembly a constant speed in the same direction as the tube movement during the cutting operation.

*2nd*.—The mechanism which transmits the motion of the slide assembly to the cutter carriage must multiply the assembly motion without alterning the characteristics of the motion being multiplied, i.e. the resulting motion, too, must have constant speed, during the cutting operation.

*3rd*.—The motion multiplying mechanism must multiply the motion of the slide assembly in precisely the amount necessary to cause the cutter carriage to have exactly the same speed as the moving tube during the cutting operation.

*4th*.—Adjustment of the speed of the cutter carriage to that of the tube must be made without interruption of the formation of the tubing.

In order to be able to adjust the extent of movement of the cutter carriage 12 while the cam shape and rotation remain unchanged, and in order to be able to do so while the machine is running, the position of the adjustment block is adjustable vertically within the slideway 88 by the screw-threaded upper end 132 of a vertical adjustment rod which threads into a tapped bore 130 in the adjustment block 102. The adjustment rod has an integral bearing collar 133 on its midportion resting on the upper surface of a bearing boss 134 having a bore through which the adjustment rod extends. To rotate the adjustment rod, there is keyed to its lower end a worm wheel 136 with which a worm 138 engages. The shaft 140 on which the worm is formed extends horizontally parallel to shaft 70, being supported at one end against endwise movement relative to worm wheel 136 and the sliding assembly 67 by a reduced portion 142 extending through a reduced bearing bore in a bearing lug 144 depending from the slidable assembly 67 adjacent the shaft housing 74. A cap 146 is keyed to the end of shaft 140 against lug 144 so that the shaft 140 moves horizontally with the slide assembly 67.

The opposite end of the shaft 140 is splined as at 146 and is rotatably supported by a bushing 148 in a bearing bracket on the housing 52.

On the splined portion is a worm gear 150 rotating with the shaft 140, but axially movable relatively thereto. The worm gear 150 is driven by a worm (not visible) from a shaft 154 connected to a motor 152 through a coupling 156. The upper end of the worm shaft has a cap 164 keyed to it and resting on a bearing lug 162 extending from the bearing bracket 78.

The motor 152 can be operated by any convenient conventional switch or push button. Due to the very great reduction in speed of rotation of the adjustment rod 132 as compared with the speed of the motor 152, it is possible to easily control the amount of movement of the adjustment block 102 upwardly or downwardly. The motor 152 should be a reversible motor operable forwardly or in reverse by pushing upon a forward or reverse button in conventional manner.

From the foregoing, it will be observed that the adjustment of the position of the adjustment block 102 can be made while the cam 56 is rotating and without interfering with the operation of the machine or action of the cutters or the winding of the tubing. Similarly, the operations equally will take place when the invention is used to operate knives and adjust their position for cutting a continuously moving web of facial tissue or other paper product which requires a clean square cut.

It will also be apparent from the foregoing description of the invention that the ratio of the movement of the adjustment block as compared to the movement of the cutter carriage can be altered without otherwise changing the characteristics of the movement imparted by the cam 56.

Many modifications within the scope of the invention will occur to those skilled in the art. Therefore, the invention is not limited to the specific embodiment illustrated and described.

What is claimed is:

1. In a machine having means for cutting into lengths a continuously formed and continuously conveyed article, a cutter carriage, means for continuously reciprocating said carriage parallel to the direction of movement of the article in such a way that during a portion of its reciprocation the carriage moves in the same direction as the article and maintains a constant velocity, said carriage reciprocating means including a horizontal slidable assembly, a pivoted lever for driving said carriage according to the movement of the assembly, and means connecting said assembly with said lever intermediate its pivot point and carriage connection, means connecting to said reciprocating means and carriage, and means to adjust said connecting means for changing the velocity of carriage movement in order to eliminate relative movement between the carriage and the article during the constant velocity portion of the carriage movement, said adjustable connecting means comprising a rotatable shaft having a screw thread thereon engaging said connecting means, a gear mounted on said shaft for moving said connecting means along the length of the lever thereby to adjust the ratio of magnification of the assembly movement imparted to the carriage, said adjusting means operating without changing the reciprocation rate of the carriage and without stopping the machine, and fixedly positioned means to drive said gear and said threaded shaft, a movable connection between said gear and driving means continuously engaged during reciprocation of said slidable assembly, said movable connection including a splined shaft and a gear turning with said splined shaft, said splined shaft and gear being relatively movable axially.

2. In a machine having means for cutting into lengths a continuously formed and continuously conveyed article, a rectilinearly movable cutter carriage, rectilinearly moving means for continuously reciprocating said carriage parallel to the direction of movement of the article in such a way that during a portion of its reciprocation the carriage moves in the same direction as the article and maintains a constant velocity, means connecting said rectilinear reciprocating means and said carriage including a pivoted lever, a slidable connection between one end of said lever and said carriage, a second slidable connection between the pivot of said lever and the end of said lever connecting said lever and said rectilinear reciprocating means, and means to adjust the position of said second slidable connection along said lever for changing the velocity of carriage movement in order to eliminate relative movement between the carriage and the article during the constant velocity portion of the carriage movement, said adjusting means operating without changing the reciprocation rate of the carriage and without stopping the machine.

3. A machine as claimed in claim 2, having fixedly positioned means to operate said adjusting means, and a movable connection between said adjusting means and said fixedly positioned means continuously engaged during reciprocation of said reciprocating means.

References Cited by the Examiner

UNITED STATES PATENTS

| | | | |
|---|---|---|---|
| 1,945,063 | 1/1934 | Moone | 83—320 |
| 2,079,974 | 5/1937 | Traut | 83—318 X |
| 3,220,320 | 11/1965 | Brigham | 83—320 X |

ANDREW R. JUHASZ, *Primary Examiner.*